(12) United States Patent
Bertsch et al.

(10) Patent No.: US 6,669,435 B2
(45) Date of Patent: Dec. 30, 2003

(54) PRECISION RESISTOR TUBE FEEDER

(75) Inventors: Thomas L. Bertsch, Pierce, NE (US); Daryl J. Klataske, Norfolk, NE (US)

(73) Assignee: Vishay Intertechnology, Inc., Malvern, PA (US)

(*) Notice: Subject to any disclaimer, the term of this patent is extended or adjusted under 35 U.S.C. 154(b) by 92 days.

(21) Appl. No.: 09/820,064

(22) Filed: Mar. 28, 2001

(65) Prior Publication Data

US 2002/0141832 A1 Oct. 3, 2002

(51) Int. Cl.[7] .............................................. B65B 21/02
(52) U.S. Cl. .................... 414/811; 414/416.09; 406/38
(58) Field of Search ........................ 414/416.01, 416.09, 414/811; 406/38; 198/347.1, 347.2, 347.3

(56) References Cited

U.S. PATENT DOCUMENTS

| | | | |
|---|---|---|---|
| 2,675,453 A | | 4/1954 | Ellin |
| 3,906,614 A | * | 9/1975 | Rayburn |
| 4,021,902 A | * | 5/1977 | Roland ......................... 29/786 |
| 4,201,507 A | * | 5/1980 | Hinchcliffe et al. ..... 414/331.09 |
| 5,011,339 A | | 4/1991 | Aurtoi et al. |
| 5,143,253 A | | 9/1992 | Takahashi et al. |
| 6,364,088 B1 | * | 4/2002 | Steffens et al. .......... 198/347.1 |

FOREIGN PATENT DOCUMENTS

| EP | 0 536 895 A1 | 4/1993 |
|---|---|---|
| GB | 2067149 A | 7/1981 |
| JP | 52-124667 | 10/1977 |
| SE | 437 972 | 10/1965 |

* cited by examiner

*Primary Examiner*—Joseph A. Dillon
(74) *Attorney, Agent, or Firm*—McKee, Voorhees & Sease, P.L.C.

(57) ABSTRACT

A system, method, and apparatus, for resistor tube feeding is disclosed. A tube magazine comprising a length of tubing and adapted for receiving precision resistor cores and compressed air is disclosed. The tube magazine may be connected to a laser spiraller and a terminal welder. The process of filling the tube magazine may be electronically controlled.

9 Claims, 14 Drawing Sheets

PRECISION RESISTOR TUBE FEEDER

BACKGROUND OF THE INVENTION

1. Field of the Invention

This invention relates to the manufacturing of precision resistors. More specifically, the invention relates to an improved apparatus, system, and method for conveying precision resistors using air injection.

2. Problems in the Art

Manufacturing of precision thin film resistors has a number of significant problems. These problems are related to the susceptibility of film resistor elements to changes in resistance caused by the manufacturing process.

For example, when resistor elements rub against each other and/or other surfaces, the resistance value of the precision resistor may shift. This is an undesirable effect, particularly for a precision resistor intended to be manufactured with a precise value with very little tolerance of error.

Another related problem in the manufacturing process is the collection of foreign particles on the resistor element which can result in bridging the resistor element laser cut causing the resistor to change its resistive value. This effect is also, of course, undesirable. These negative effects are all associated with the typical precision resistor manufacturing process.

Typically, in the manufacture of precision resistors, after the laser spiraling process, the precision resistor cores are poured into a vibrating feed system or a notched rotating drum device. This vibrating feed system feeds the capped resistor cores to a welder where the lead terminals of the resistor are attached. During this process, resistor elements are in contact with other resistors. The resistor elements are also in contact with, and may be forced against other surfaces such as the rotating drum device.

When precision resistor cores are stored or transported, they are placed in bags or boxes. This method of storing or transporting precision resistor cores has a negative effect on the precision resistor cores. The contact of the precision resistor cores with each other within the bag or box also may cause the precision resistor cores to change their resistive values.

These problems create difficulties in manufacturing thin film precision resistor elements that are precise. The resistance of the film resistor may be altered by the manufacturing process resulting in a resistor not having the precision desired.

It is therefore an objective of the present invention to provide an apparatus, system, and method of conveying precision resistor cores and other electronic or non-electrical components.

It is a further objective of the present invention to provide an apparatus, system, and method of a precision resistor tube feeder.

It is a further objective of the present invention to provide an apparatus, method, and system of transporting precision resistor cores.

It is a further objective of the present invention to provide a method, system, and apparatus of transporting resistor cores that results in reduced contact between resistor cores.

Another objective of the present invention is to provide a system, method, and apparatus for transporting resistor cores that reduces the contact between resistor cores and manufacturing equipment.

Another objective of the present invention is to provide a system, method, and apparatus of transporting resistor cores that reduces contact between the resistor cores and foreign particles.

Another objective of the present invention is to provide an apparatus and system capable of receiving precision resistor cores from a laser spiraller.

Another objective of the present invention is to provide an apparatus and system capable of providing resistor cores to a welder.

Another objective of the present invention is to provide a system, method, and apparatus of manufacturing precision resistors that reduces resistance value shift caused during the manufacturing process.

Another objective of the present invention is to provide a method, system, and apparatus for precision resistors that permits the precision resistors to be counted.

Another objective of the present invention is to provide an apparatus for storing precision resistor cores.

Another object of the present invention is to provide an apparatus, system, and method for transporting precision resistor cores during the manufacturing process that does not significantly slow the process.

These and other objectives will become apparent from the following description.

SUMMARY OF THE INVENTION

The following invention describes a system, method, and apparatus for the manufacturing of precision resistors. The invention provides for precision resistor cores to be air injected into a length of tubing. The tubing may be wrapped around a tube forming a tube magazine. The tube magazine is capable of receiving or dispensing the precision resistor cores that may be air injected into or from the tube magazine. The tube magazine replaces boxes or bags, and vibrating feed systems. The tube magazine has the advantage of reduced contact between precision resistor cores and between precision resistor cores and surfaces. The invention also reduces the contact with foreign particles that are present in a typical manufacturing environment.

One aspect of the invention includes a system for receiving the precision resistor cores from a laser spiraller and loading a tube magazine. Another aspect of the invention includes receiving resistor cores from a tube magazine and dispensing the resistor cores to a welder or a capper. Optionally, the precision resistor tube feeder may be electronically controlled, may count the resistors, and have other additional functionality such as an optional display or light tower used to provide visual feedback of the tube feeding process.

DETAILED DESCRIPTION OF EXEMPLARY EMBODIMENTS

Figure 1:
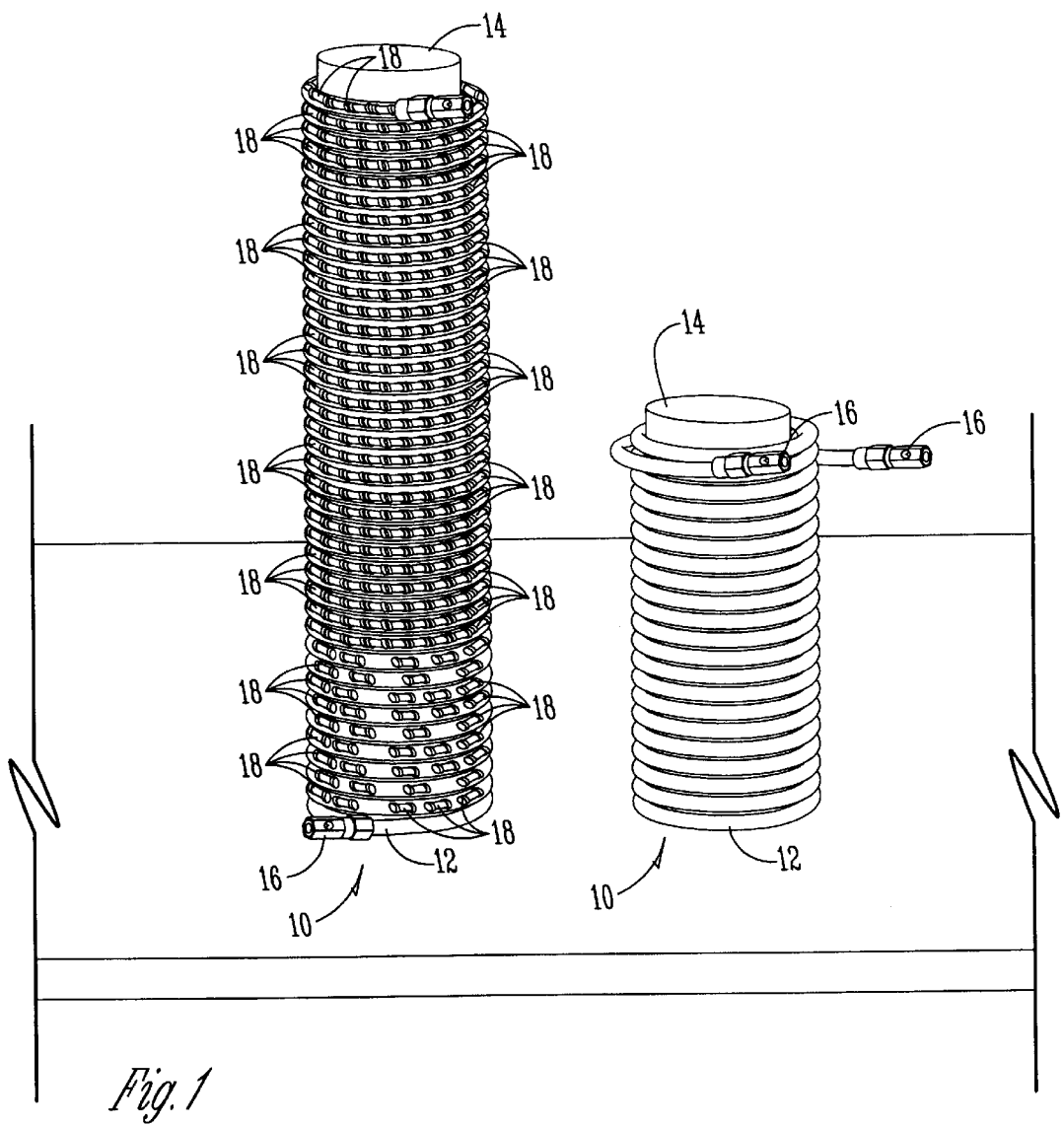
FIG. 1 is an isometric view of the tube magazine of the present invention.

FIG. 1 is a diagram of the precision resistor tube magazine of the present invention. Two different tube magazines 10 are shown. As shown, the present invention contemplates that the tube magazine may be of differing sizes. The tube magazine is constructed from tubing 12 such as low density polyethylene tubing or other tubing capable of accepting precision resistor cores. Each tube has tubing ends 16. The tubing 12 is wrapped around cardboard shipping tube 14. The present invention contemplates that other types of tubes may be used. The present invention contemplates that the tubes need not be cylindrical and that the tubes may be of varying sizes and made of various materials. Cardboard shipping tubes may be used as they are both inexpensive and light weight. In addition, FIG. 1 shows precision resistor cores 18 within tube magazine 10.

Figure 2:
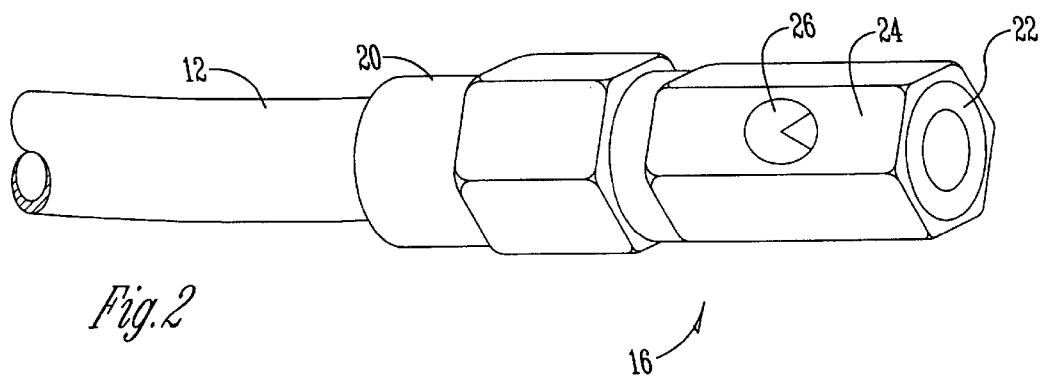
FIG. 2 is an isometric view of the tube end of the tube magazine of the present invention.

FIG. 2 shows a diagram of tubing end 16. In tubing end 16, tubing 12 is connected to one-touch fitting 20 which is connected to a cone-point set screw 22 which is connected to an aluminum stand-off 24. The aluminum stand-off has a cross-hole 26 for venting purposes. The present invention contemplates that other types of fittings may be used on tubing 12 to provide for the receipt or release of compressed air.

Figure 3:
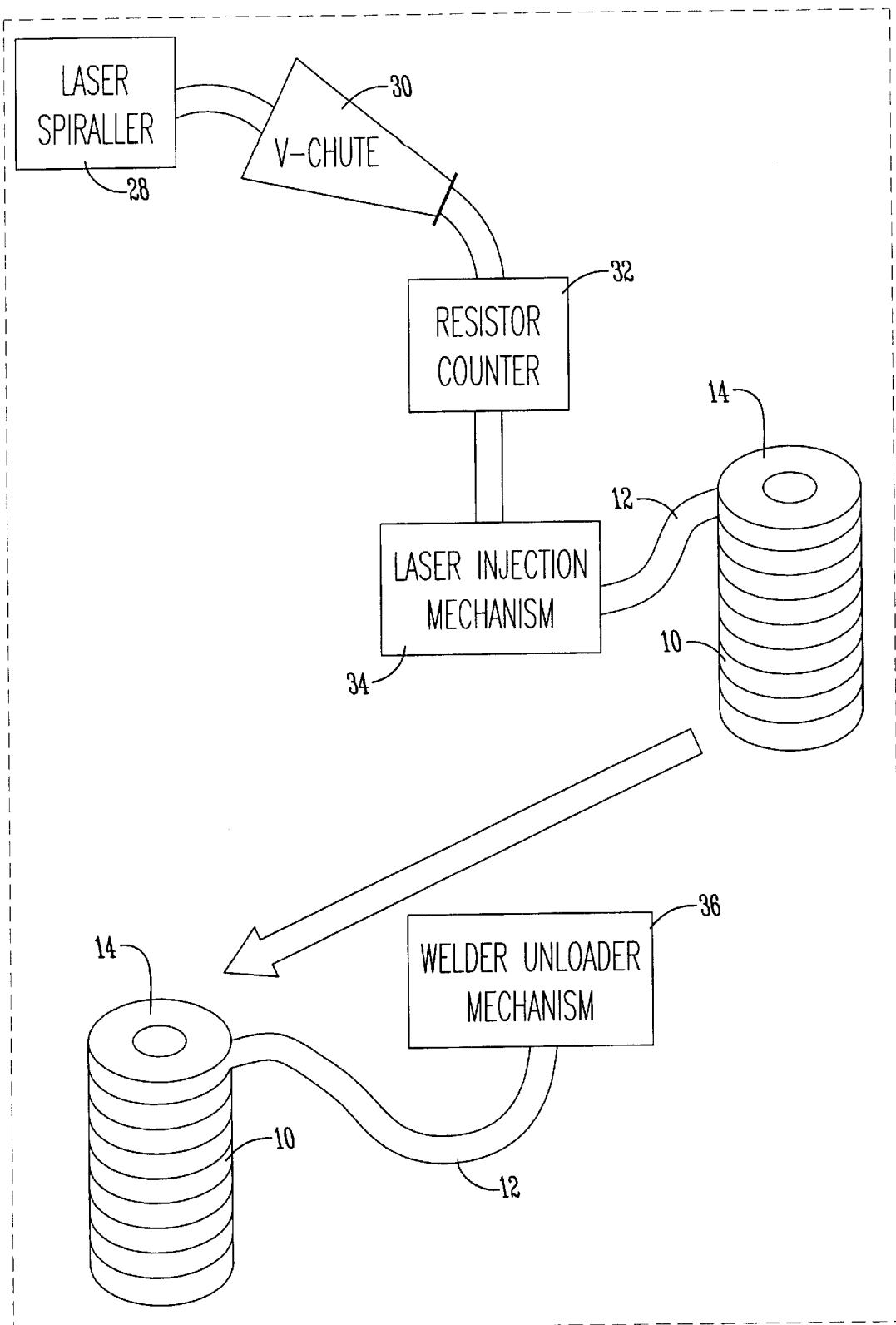
FIG. 3 is a diagrammatic representation of the system of the present invention.

FIG. 3 shows an overview of the tube magazine as used in a precision resistor manufacturing process. In FIG. 3, a laser spiraller 28 conducts laser trimming of precision resistor cores. These cores are then exited from the laser spiraller through the vibrating chute (v-chute) 30 and past a resistor counter 32. The resistor counter 32 counts the number of resistors passing through. The resistor counter may be an optical sensor detecting the presence of each resistor core as it passes by the resistor counter. The precision resistor cores pass onto the laser injection mechanism 34. The laser injection mechanism 34 is then connected to tubing 12 of the tube magazine 10. Precision resistor cores are air injected into the tube magazine 10, tube magazine 10 may then be transported, conveyed, or toted so that tube magazine 10 may be moved to the welder unloader mechanism 36. The welder is used to weld terminals onto the precision resistor cores. The tube magazine 10 is connected to the welder unloader mechanism 36, so that precision resistor cores may be air injected from the tube magazine 10 into the welder unloader mechanism 36. The present invention contemplates that multiple tube magazines may be connected to the laser injection mechanism at the same time as will later be explained.

Figure 4:
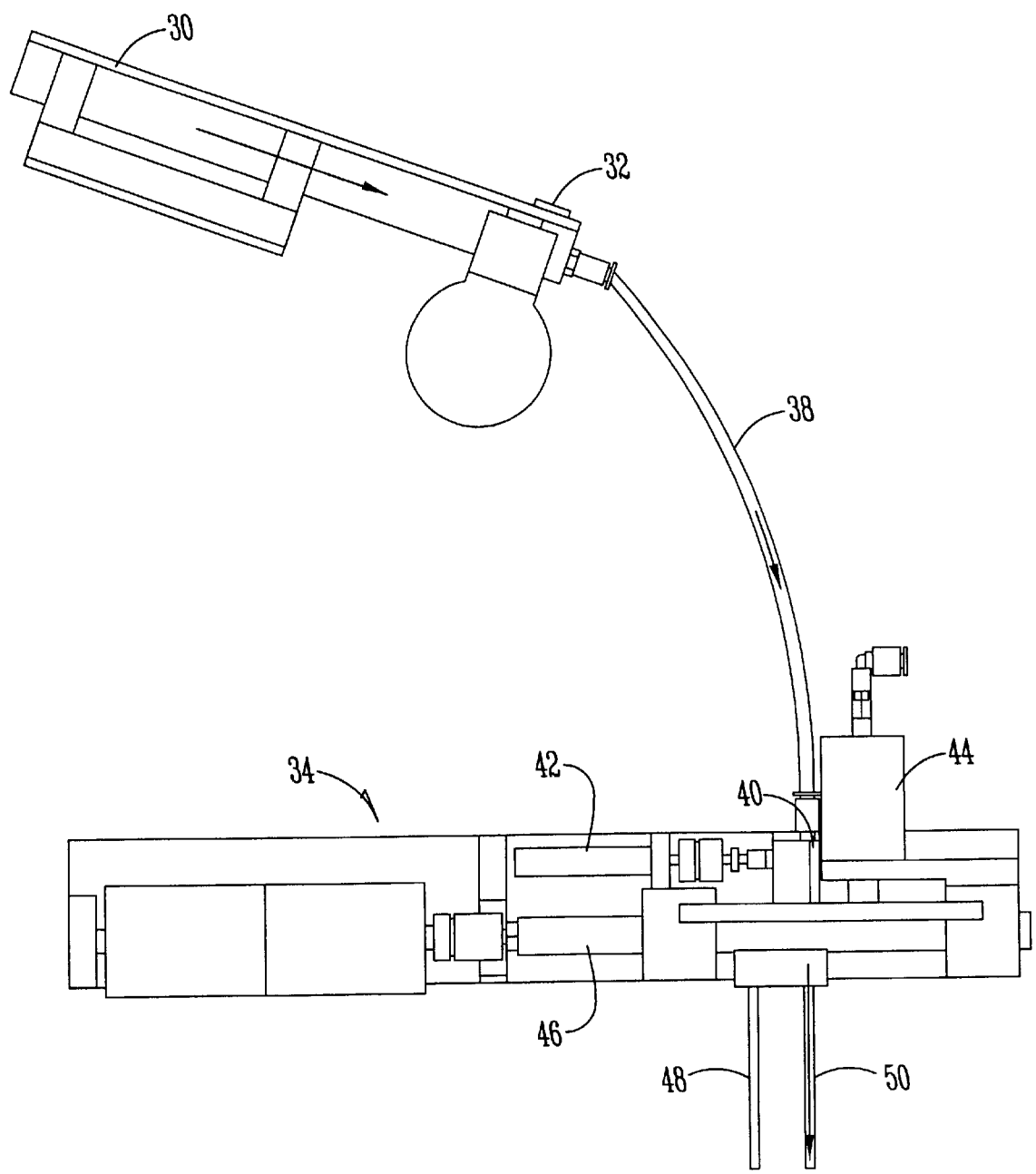
FIG. 4 is a front view of the laser injection mechanism of the present invention.

FIG. 4 shows the laser injection mechanism. Precision resistor cores descend the v-chute 30, past resistor counter 32. Then the resistors flow through the vibrating chute 30 into the laser injection tubing 38 and into resistor hold cavity 40. This cavity may be in a receive position or a part stop position as determined by the resistor hold cylinder 42. Inject cylinder 44, when activated in conjunction with the inject air valve, releases pressurized air that injects resistors within the resistor hold cavity 40 into tube magazine 50.

Figure 5:
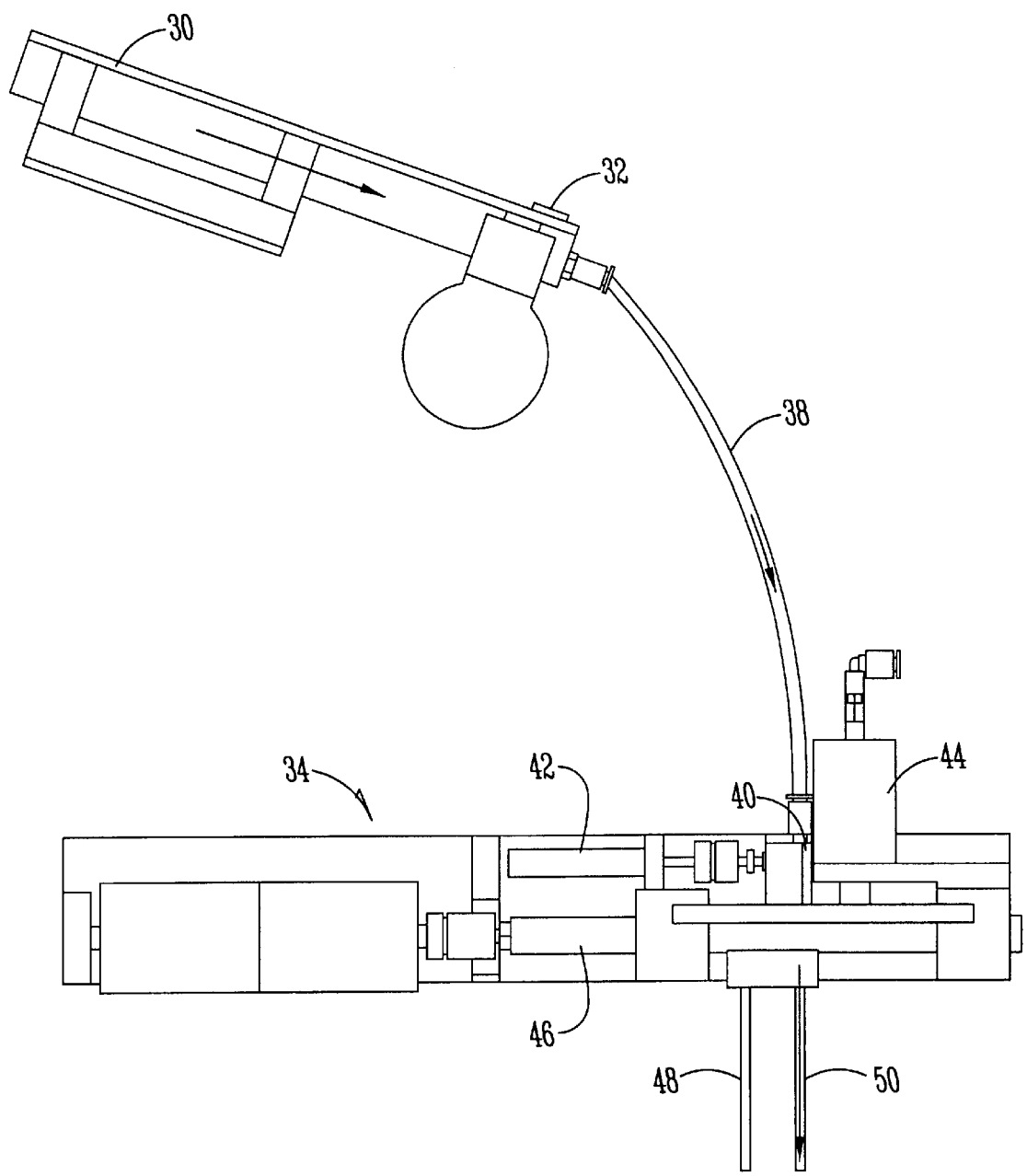
FIG. 5 is a front view of the laser injection mechanism of the present invention with the resistor hold activated.

In FIG. 5, laser injection mechanism 34 is shown with the resistor hold cylinder activated such that the resistor hold cavity 40 is not receiving precision resistor cores. This is a resistor hold or part stop position.

Figure 6:
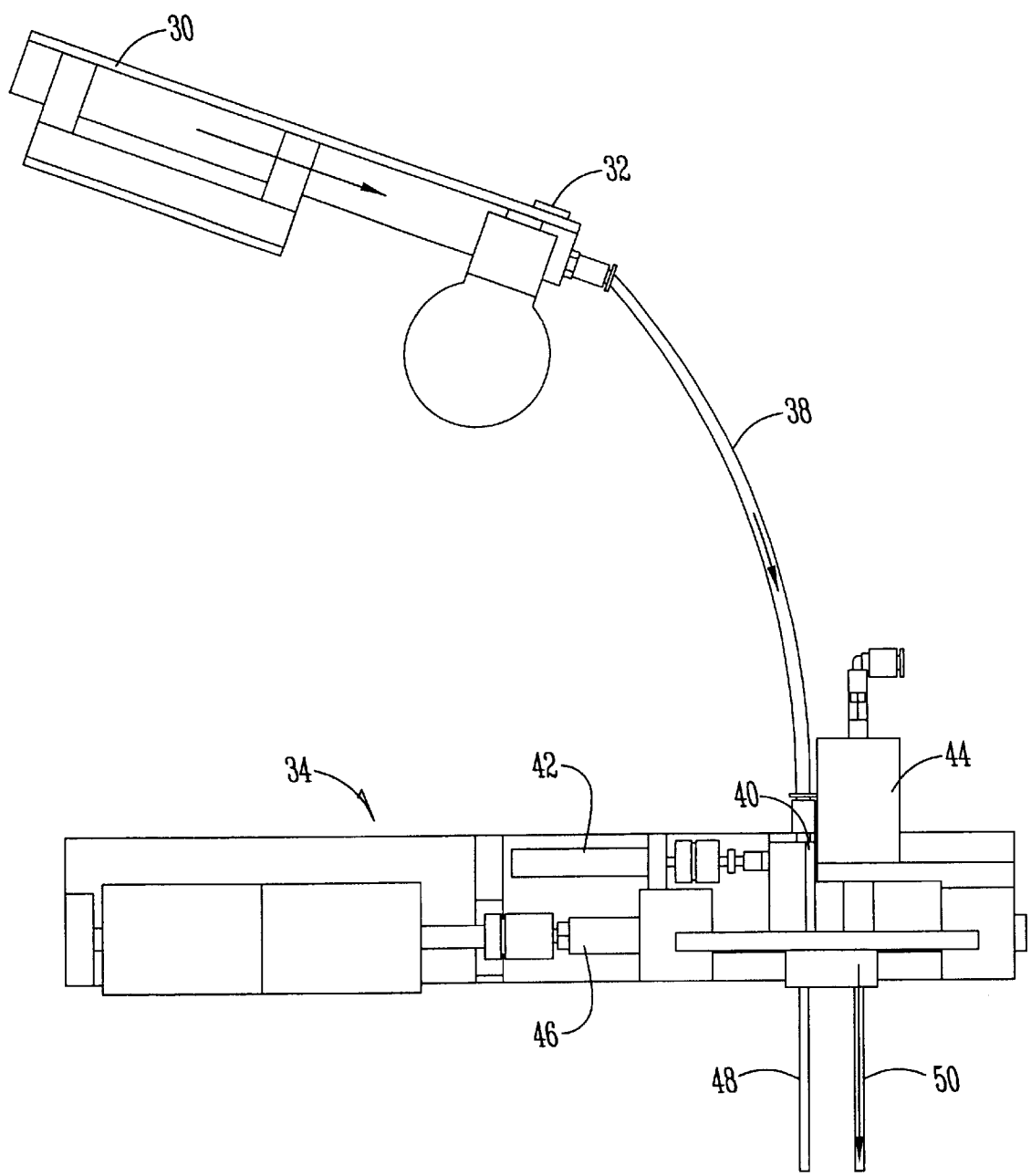
FIG. 6 is a front view of the laser injection mechanism of the present invention with the injector activated.

In FIG. 6, laser injection mechanism 34 is shown. In FIG. 6, inject cylinder 44 is shown as activated. Activation of inject cylinder 44 as shown allows pressurized air to inject the precision resistor cores into the tube magazine.

Figure 7:
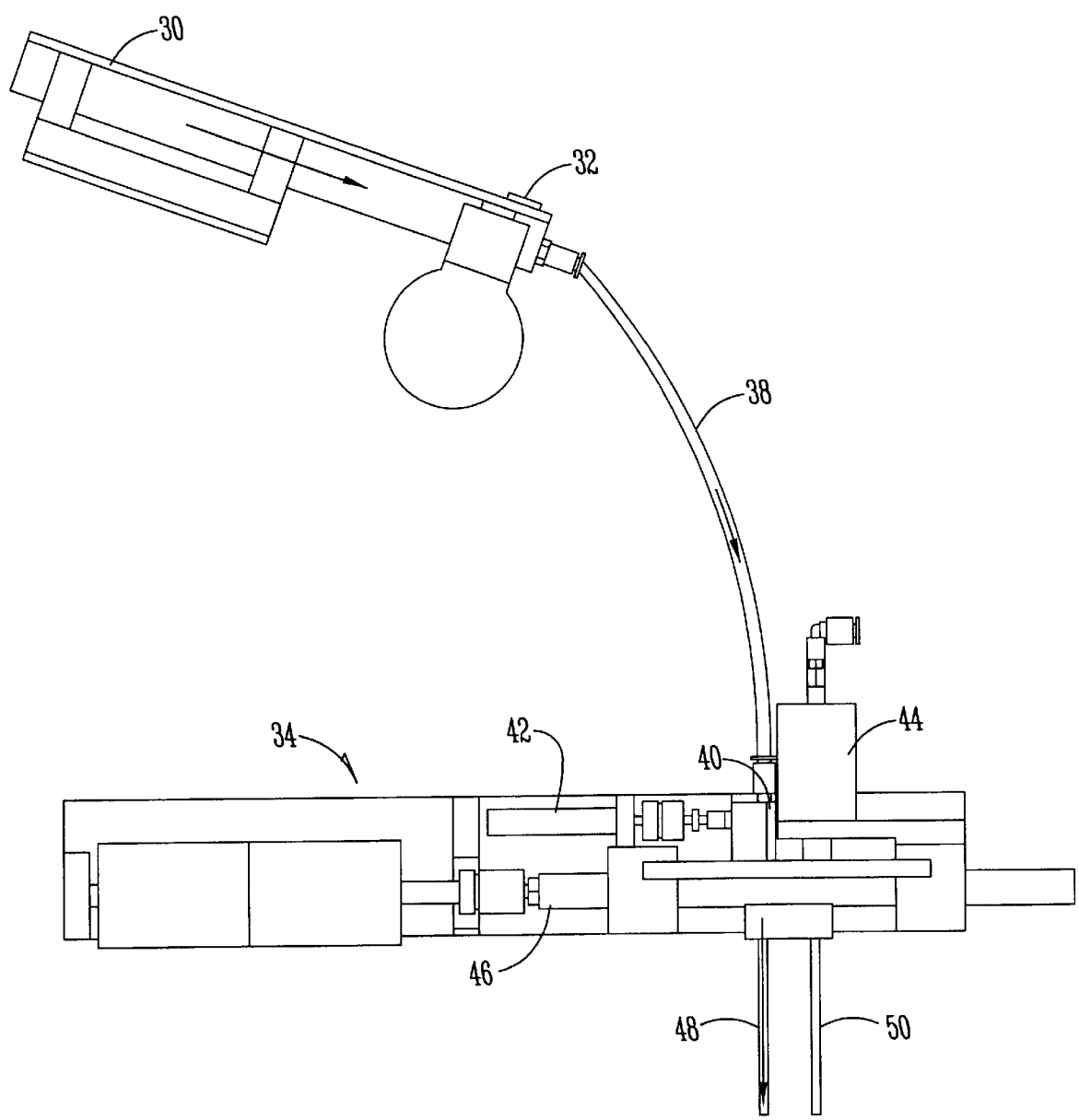
FIG. 7 is a front view of the laser injection mechanism of the present invention with the injector shuttle in a second position.

In FIG. 7, laser injection mechanism 34 is shown with injector shuttle 46 in a secondary position. This second position permits precision core resistors to be loaded into tube magazine 48 instead of tube magazine 50. The present invention contemplates that any number of tube magazines could be used. Two is a convenient number as it permits one tube magazine to be emptied or stored, or conveyed while a second tube magazine is being filled. The ability to use multiple tube magazines ensures that the manufacturing process does not slow down, as one tube magazine can be removed or replaced while a different tube magazine may remain connected.

Figure 8:
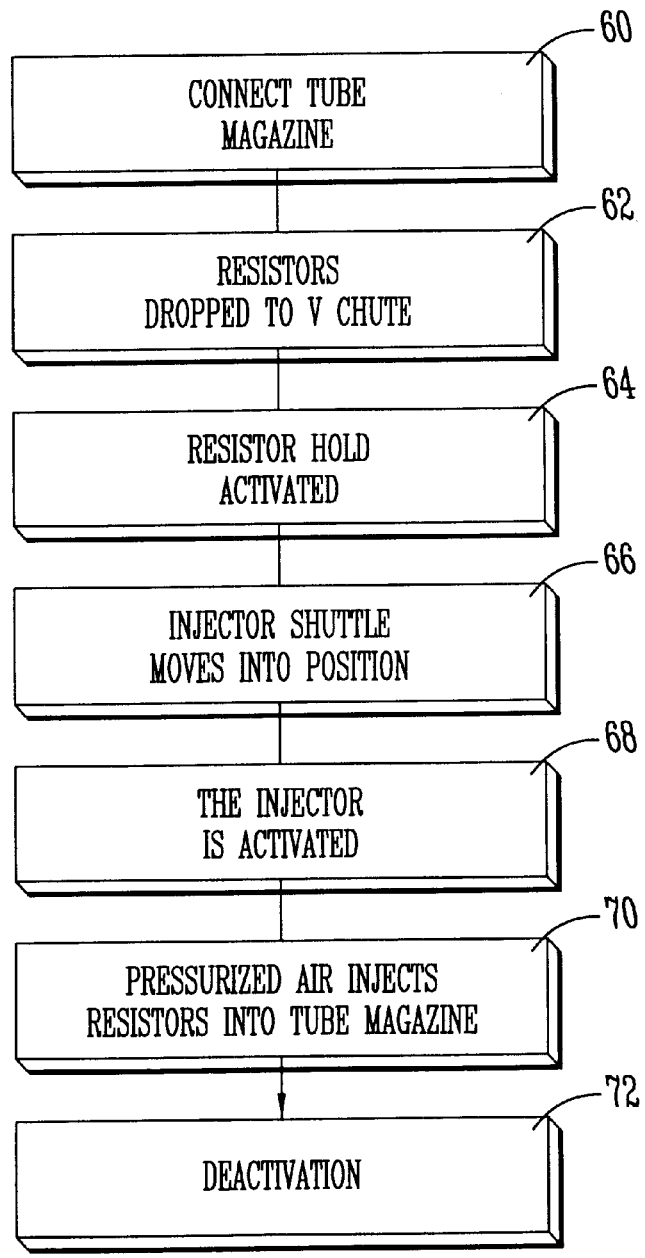
FIG. 8 is a flow chart of the process of filling a tube magazine of the present invention.

FIG. 8 shows a flow chart of the method of the present invention. In step 60 a tube magazine is connected to the laser injector mechanism 34. In step 62, precision core resistors are dropped into the vibrating chute 30 of the laser injector mechanism 34. In step 64, the resistor hold 42 is activated. The resistor hold prevents additional resistors from entering the resistor hold cavity 40. Then, in step 66, the injector shuttle 46 moves into position. The position associated with the particular tube magazine into which the precision resistor cores are to be injected. For example, there may be a first position and a second position where two tube magazines are used. In step 68, the injector 44 is activated. Then, in step 70 pressurized air injects the precision resistor cores into the tube magazine 10. In step 72, deactivation takes place, the air being stopped and the resistor hold being deactivated, so that the process may be repeated.

Figure 9:
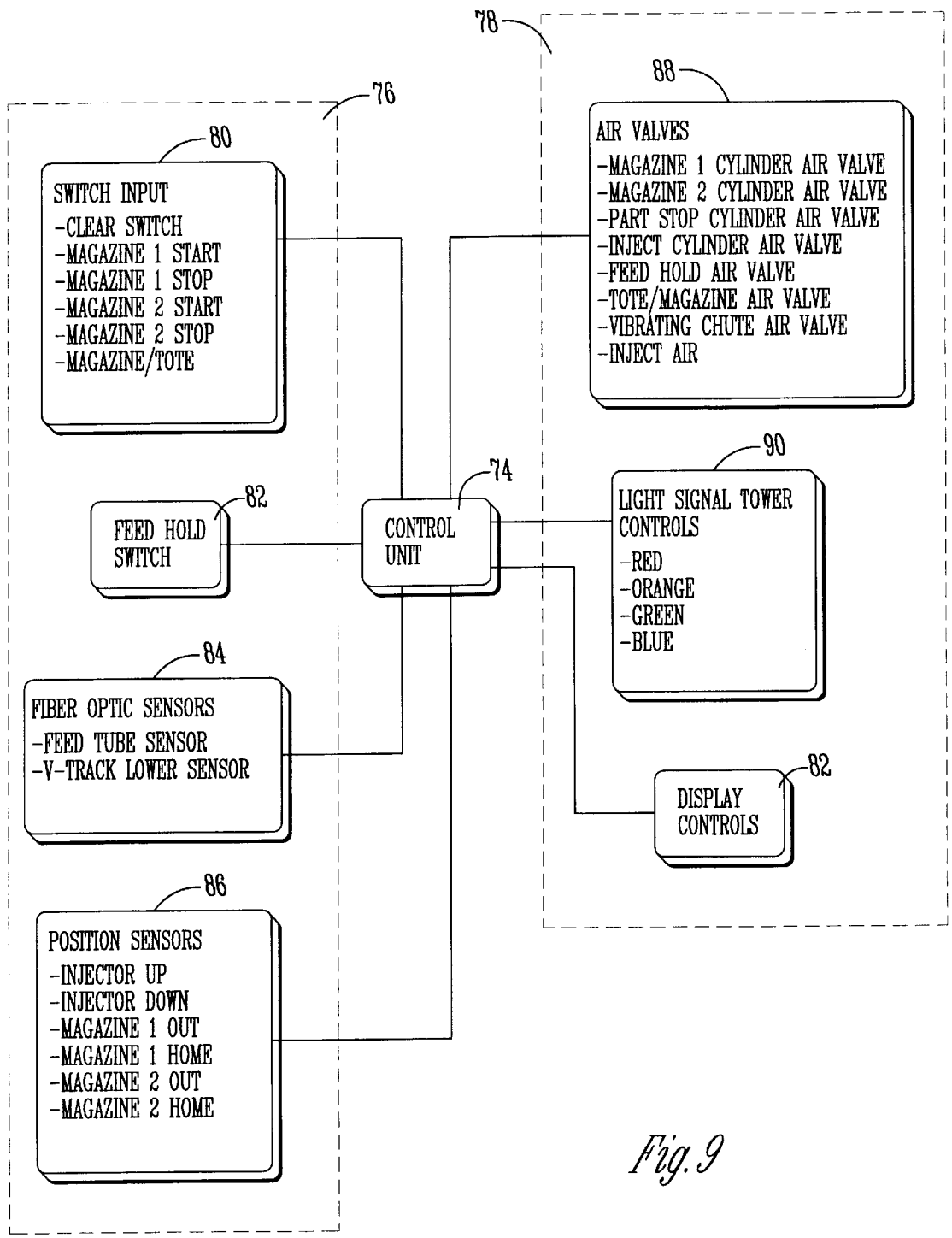
FIG. 9 is a block diagram of the electrical control of the present invention.

The present invention is capable of electronic control. This control is best shown in FIG. 9. In FIG. 9, a control unit 74 is shown. Control unit 74 provides intelligent control of the process. The intelligent control unit 74 may be a RPC-150 single board computer with a Z-180 processor available from Remote Processing Corporation. This control unit may run a CAMBASIC program. The present invention contemplates other types of control units including microprocessors, microcomputers, integrated circuits, processors, and other intelligent control devices. Similarly, the present invention contemplates that other types of computer languages such as assembly languages, BASIC, C, and other languages may be used. The present invention is in no way limited to the type of control unit or the software running on the control unit. The present invention also contemplates that there need not be software as the control unit may be implemented in a hardware device such as through control logic or other electronic circuitry.

Control unit 74 is connected to a number of inputs and outputs. Inputs 76 to the control unit 74 include switch inputs 80, feed hold switch input 82, fiber optic sensors 84, and position sensors 86.

The switch inputs 80 may include a clear switch, a magazine one start switch, a magazine one stop switch, a magazine two start switch, a magazine two stop switch, and a magazine/tote switch. The use of these switches will later be discussed in greater detail.

The feed hold switch 82 is a switch that provides control over the feed hold on the laser spiraller. The interface of this switch to the laser spiraller will be dependent upon the circuitry of the laser spiraller, the connection of a switch well known in the art.

The fiber optic sensors 84 are sensors that are used to determine whether there are precision resistor cores in the particular portion of the system. One fiber optic sensor may be a feed tube sensor to determine if there are precision resistor cores in the feed tube 38. This sensor is helpful in determining if there is a jam in the feed tube 38. Another fiber optic sensor may be the V-chute lower sensor used to count the precision resistor cores. One example of a fiber optic sensor that may be used is the SUNX FD-G500 sensor. The present invention contemplates that additional fiber optic sensors could be used, or other sensors capable of detecting the presence of precision resistor cores.

The position sensors 86 may include Hall effect sensors or other sensors capable of sensing position. Such sensors may be used to determine if the injector is in an up position, to determine whether the injector is in a down position, to determine whether a first tube magazine is not in position, to determine whether a first tube magazine is in position, to determine whether a second tube magazine is not in position, and to determine whether a second tube magazine is in position. One example of a Hall effect sensor that may be used is the BIMBA HKX Hall effect sensor. The present invention contemplates that fewer or greater numbers of sensors may be used as a particular environment or variations may suggest in order for counting purposes and for monitoring or preventing errors in the process.

The control unit 74 is also connected to a number of outputs 78. These outputs include the air valves 88, the light signal tower controls 90, and a display 92. The air valves are actuators used to turn on or off air injection or air cylinders. The light signal tower and display are used to provide visual feedback and monitoring of the process by an operator.

The air valve 88 permit the control unit 74 to electronically control the opening or closing of air valves. These air valves include a magazine one cylinder air valve, a magazine two cylinder air valve, a part stop cylinder air valve, an inject cylinder air valve, inject air valves, a feed hold air valve, a tote/magazine air valve, and a vibrating chute air valve.

The light signal tower controls 90 are also electronically controlled by control unit 74. The light signal tower provides operators with a visual feed back as to the status of the precision resistor tube feeder. This may be accomplished through the use of different colors of lights on the light signal tower. These colors may include red, orange, green, and blue. Each different color is associated with a different status of the precision resistor tube feeder. The light tower may be a PATLITE 4 light signal tower.

Display controls 92 are also electronically connected to control unit 74. The display unit also provide feed back as to the current status of the precision resistor tube feeder. This can include a count of the number of precision resistor cores that are in the currently filled tube magazine, including a message indicating whether or not a tube magazine is full.

The display unit may be a standard two line LCD, such as the two line, 16 characters per line ILM-216L available from Scott Edwards Electronics.

Figure 10:
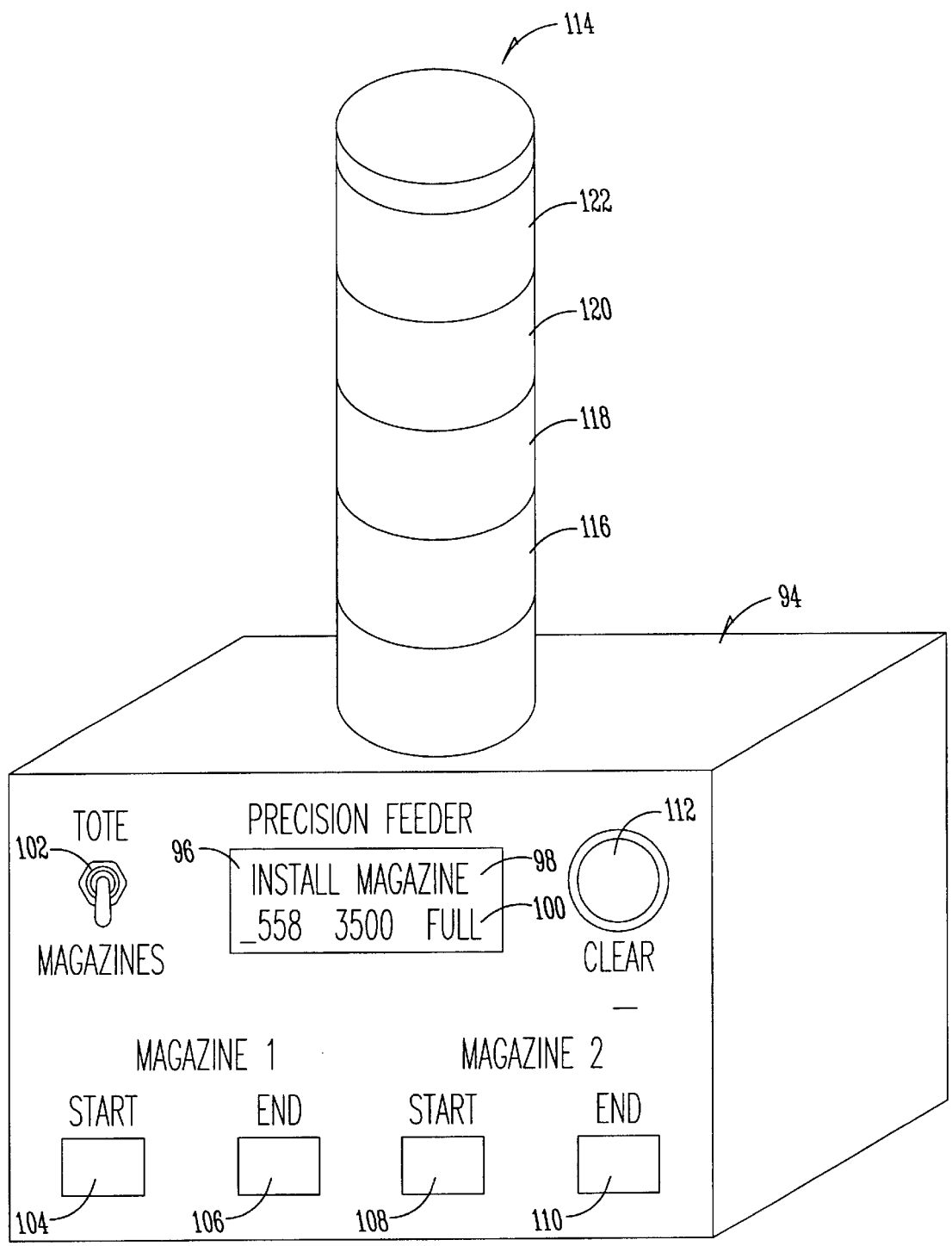
FIG. 10 is an isometric view of the control unit of the present invention.

FIG. 10 shows enclosure 94. Enclosure 94 includes a display unit 96. The display unit may be a two line LCD with a first line 98 and a second line 100. The enclosure also contains tote switch 102. The enclosure 94 also contains a number of switches including the magazine one start switch 104, the magazine one end switch 106, the magazine two start switch 108, and the magazine two end switch 110. The enclosure 94 also includes a clear button 112. Placed on top of the enclosure 94 is light tower 114. Light tower 114 includes a blue light 116, a green light 118, an orange or yellow light 120, and a red light 122.

The magazine one start switch is used by the operator to indicate that a new magazine one is properly in place and ready to be filled.

The magazine one end switch is used by the operator to indicate that the operator no longer wishes to continue to fill magazine one.

The magazine two start switch is used by the operator to indicate that a new magazine two is properly in place and ready to be filled.

The magazine two end switch is used by the operator to indicate that the operator no longer wishes to continue to fill magazine two.

The clear button is used by the operator after the feeding process has stopped due to an error such as a tube jam error or a vibrating chute error, or other error. The operator presses the clear button to indicate that the problems that caused the error have been resolved.

The light tower provides a visual feedback of the operation of the precision resistor tube feeder. Each light may have special meaning. For example, the red light may indicate that the process has stopped due to an error.

Figure 11A:
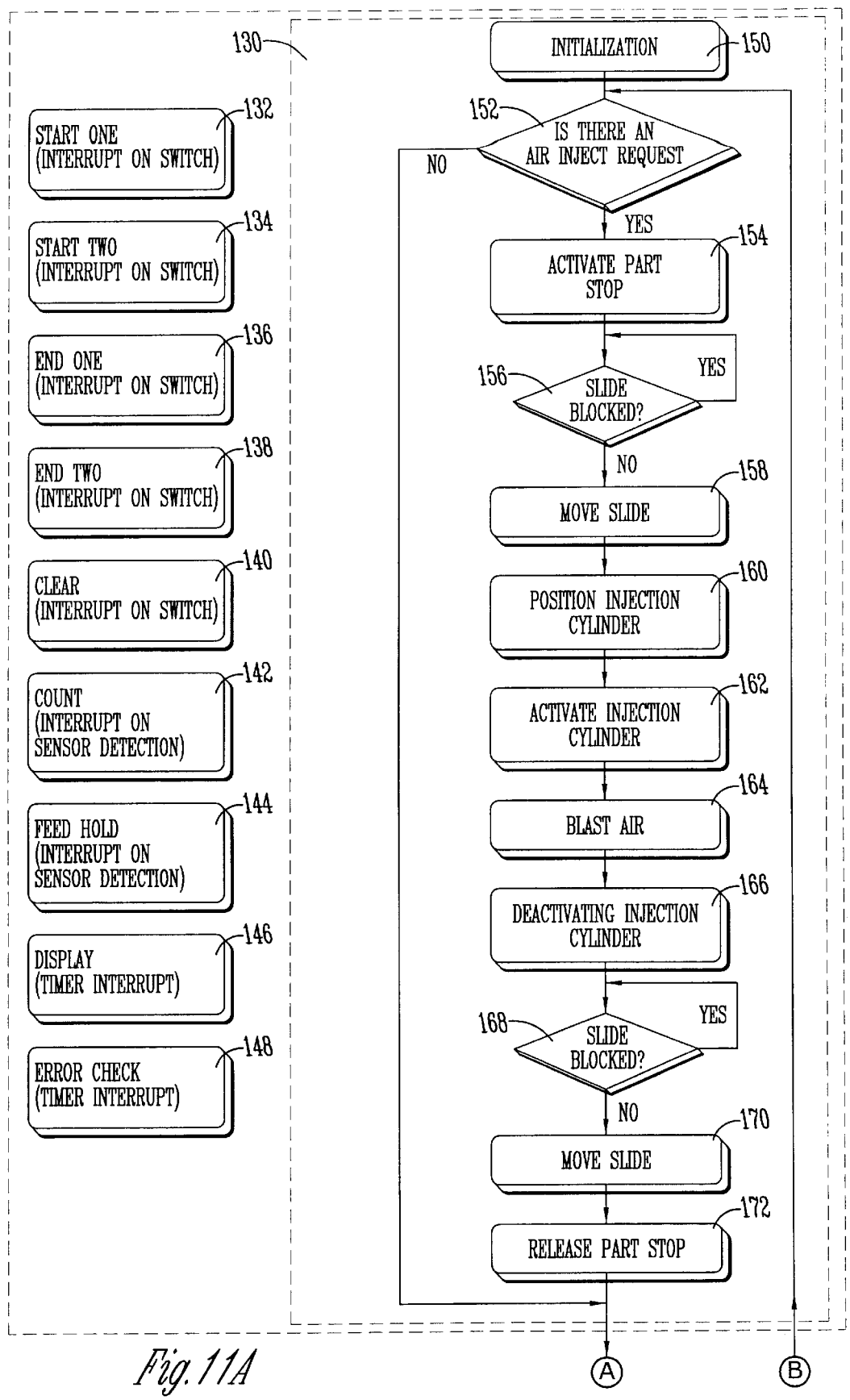
FIG. 11 is a flow chart of the software process of the control unit of the present invention.

FIG. 11 shows a flow chart of the program of the present invention. The program may be implemented in software or the same logical flow may be implemented in hardware as well. The program includes a main routine 130 as well as a number of subroutines. The subroutines include the start one subroutine 132 which is activated upon interrupt by the start one switch; the start two subroutine 134 which is activated upon interrupt by the start two on switch; the end one subroutine 136 which is activated upon interrupt of the end one on switch; the end two subroutine 138 which is activated upon the interrupt associated with the end two on switch; the clear subroutine 140 which is activated upon by the clear switch; the count subroutine 142 which is activated upon interrupt of a sensor detection; the feed hold subroutine 144 which is activated upon the interrupt of a switch detection; the display subroutine 146 which is activated through a timer interrupt; and the error check subroutine 148 which is activated through timer interrupt. Control is only switched from the main routine to the subroutines when one of the switches is activated or when one of the timer events occurs.

Returning to the main routine 130, in the first step of the main subroutine 130, an initialization step 150 takes place. The initialization step 150 clears the variables, timers, and other housekeeping activities such as are well known in the art and dependent upon the specific language used.

In step 152 a determination is made of whether there is an air injection request. If there is an air injection requested in step 152 then in step 154 the part stop is activated.

Figure 11B:
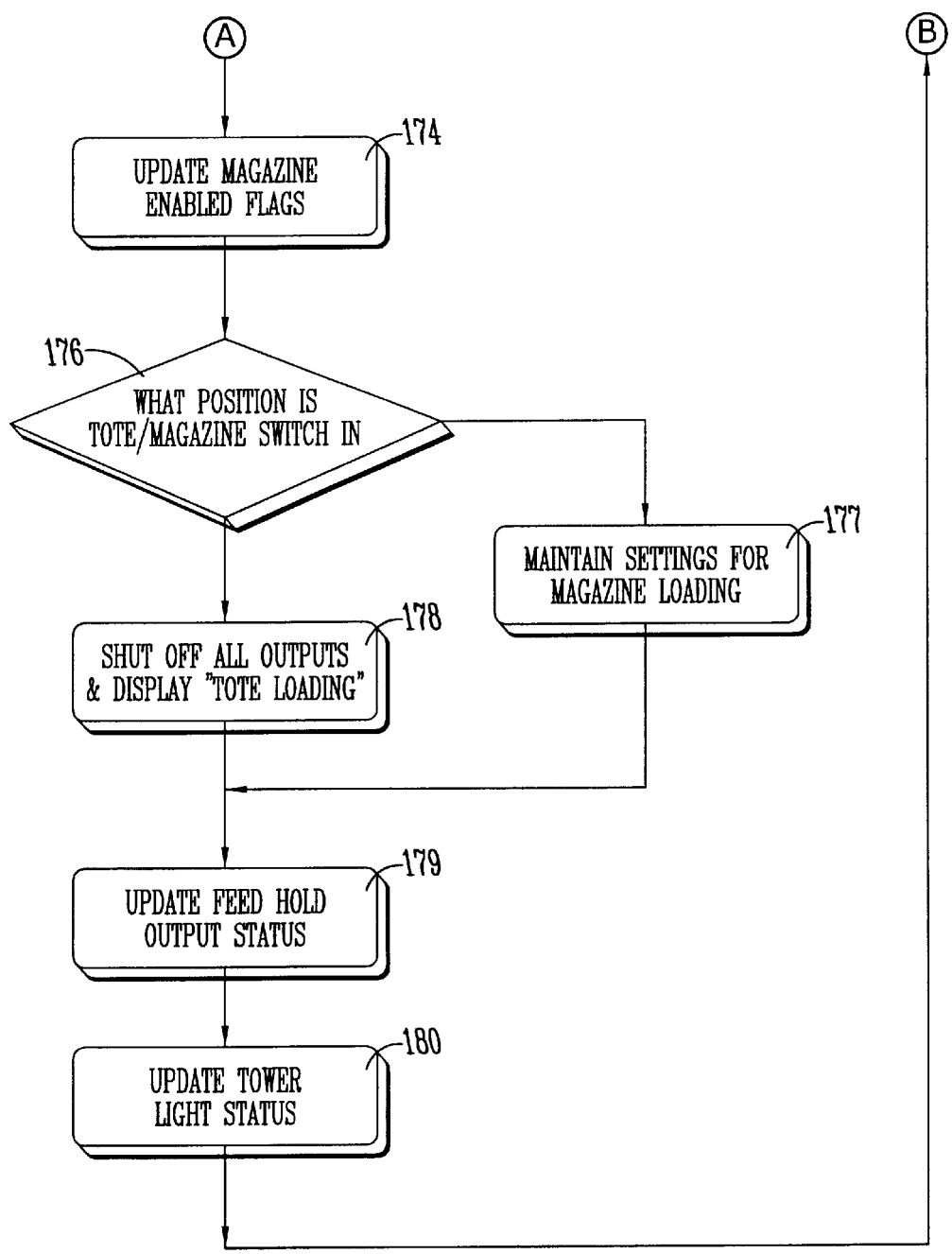

Preceding to step 154, after the part stop on the air injection mechanism is activated to ensure that there is no more flow of precision resistor cores, in step 156 a determination is made as to whether or not the slide is blocked. If the slide is blocked then this determination is made again. If the slide is not blocked, then in step 158, the slide is moved into the appropriate position for the tube magazine being filled. In step 160 the position injection cylinder is activated and in step 162 the injection cylinder is activated. These steps prepare for step 164 in which air is blasted, injecting the precision resistor cores into the tube magazine. In step 166, a deactivation step takes place whereby the injection cylinder is deactivated as is the position injection cylinder. Then in step 168 a determination is made as to whether the slide is blocked. If the slide is blocked, then the determination is made again. If the slide is not blocked, then the slide is moved in step 170. Once the slide is moved, the part stop is released in step 172. Referring now to FIG. 11B, in step 174 the magazine enabled flags are updated based on magazine count status. In step 176 the position of the magazine/tote switch is checked to determine operation mode. If the switch is in the tote position then all of the outputs are shut off and "TOTE LOADING" is displayed according to step 178. If the switch is in the magazine position then the settings are set or maintained for magazine loading operation in step 177. In step 179 the feed hold output status is updated. In step 180 status of the lights on the light tower 114 is updated. The main loop then repeats itself after the state of the tower lights is updated in step 180, the determination of whether an air injection request is made in step 152 of FIG. 11A.

This process of the main subroutine 130 is, of course, interrupted upon occurrences associated with the interrupts. Thus when any of the switches associated with the interrupt are activated, an interrupt occurs. Similarly, when the sensor detection related to the count 142 or a sensor detection related to feed 144 is activated, then this process will interrupt for the subroutine. Similarly on a periodic basis, the main routine will be interrupted in order to update the display. Also on a periodic basis, the main routine will be interrupted in order to check for errors.

The subroutines are generally for setting and clearing flags associated with button presses, sensor switches, or other inputs. The setting of a flag or an error flag to indicate the position of a switch is known in the art. The start one event interrupt monitors the status of the start magazine one switch. If magazine one is not already enabled or otherwise ready when the start one switch is pressed, the start one event interrupt routine will set or clear any flags to indicate that the magazine one is enabled and ready and will also clear the current magazine one part count so that a new count can begin.

The start two event interrupt monitors the start magazine two switch. If the start two switch is pressed and the magazine two is not already enabled already, flags are set or cleared accordingly. For example, the magazine two part count would be cleared to indicate that a new count should begin. The new count would count the precision resistor cores in magazine two. In addition, if a flag was set to indicate that magazine two was full, this flag should be cleared, as magazine two has been replaced with a new magazine.

The end one event interrupt routine monitors the end magazine one switch. When this routine is activated through pressing the end one switch, flags are cleared to indicate that magazine one is no longer enabled and magazine one is no longer ready. Thus, there will be no attempt to fill magazine one as the user has indicated that the process of filling magazine one is complete.

The end two interrupt routine functions similarly. The end two event interrupt routine monitors the end magazine two switch. If the end magazine two switch is pressed then the magazine two enabled flag is cleared and the magazine two ready flag is cleared to indicate that magazine two should not be filled at this time.

The clear event interrupt routine is activated through the clear switch. This routine is used after an operator who is monitoring the process has manually fixed errors such as a jam in the tube or a jam of the vibrating chute. When the clear switch is pressed, the two jam error flag is cleared if the sensor does not indicate that the jam still exists. Similarly, the V-chute jam error flag is also cleared if that sensor does not detect the presence of the jam. All other error flags are then cleared and the red tower light is turned off. Then the feed hold may be turned on, the vibrating chute may be turned on, and the part counter may be reset.

The error check subroutine may be set for a timed interrupt of one second. The error check subroutine may be used to monitor the part count. For example, if the count has been reduced to zero indicating that a tube is full, appropriate action may be taken. For example, the vibrator may be turned off, the red power light may be turned on, and the feed hold switch may be turned on.

Figure 12:
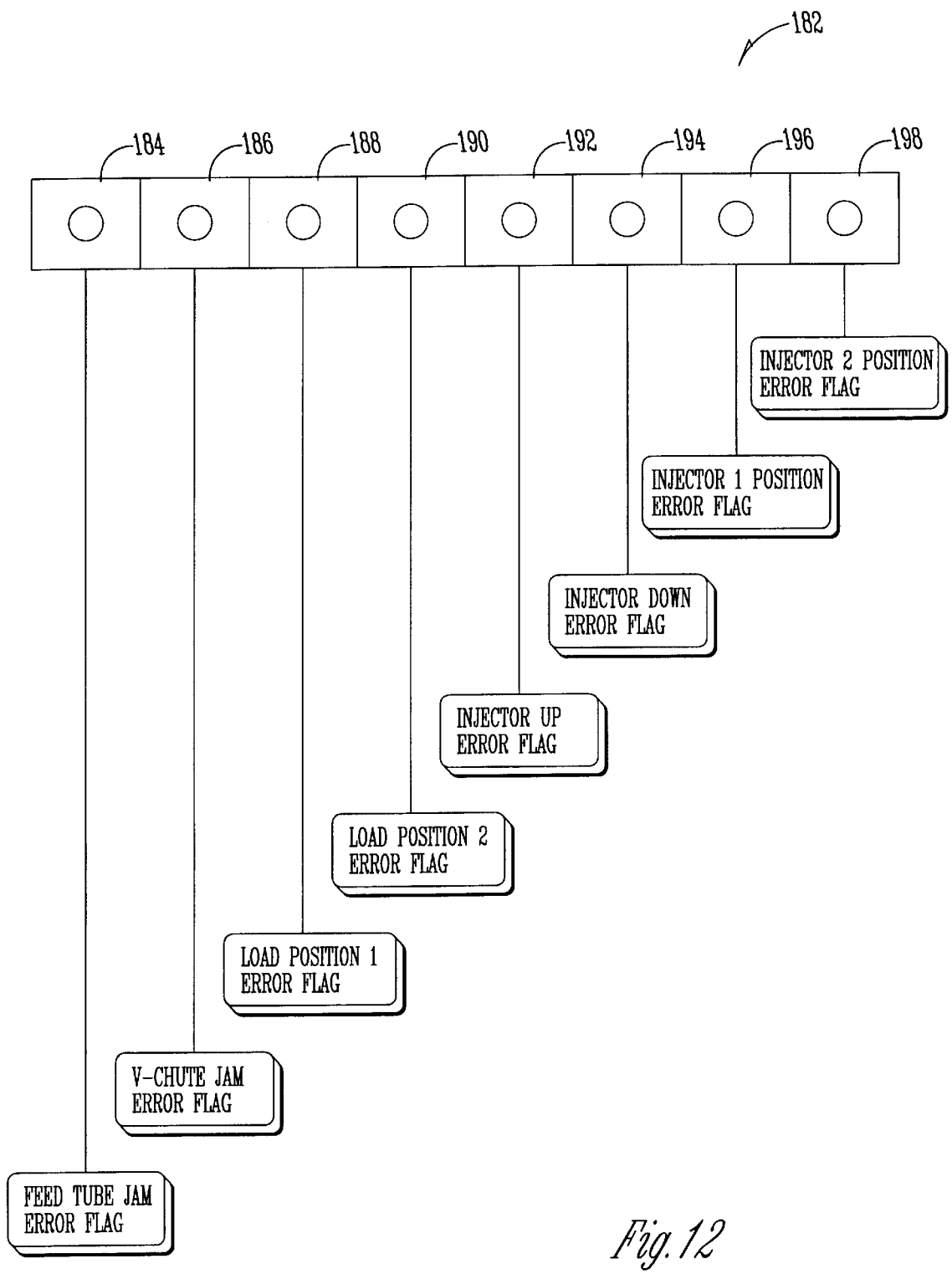
FIG. 12 is a representative depiction of potential error flags of the present invention.

An example of potential errors is shown in FIG. 12. These errors may include a feed tube jam error 184, a vibrating chute jam error 186, a position one error 188, a position two error 190, an injector up error 192, an injector down error 194, an injector one error 196, and an injector two error 198. These errors may be represented by error flags. The error flags are related to the condition of sensors and switches, the error flags may be set or cleared by the subroutines.

The display subroutine occurs on a timer interrupt that may be set for every two to three seconds. The display may be updated to display the number of parts counted or indicating the word "FULL" if the maximum part count has been reached. In addition, dependent upon the state of the machine, additional display information may be shown such as when the feed hold switch is active, the words "LASER FEED HOLD" may be shown. Similarly, if neither of the magazines had been enabled, the words "INSTALL MAGAZINE" may be shown. If the feed tube jam error flag has been set, the words "FEED TUBE JAM" may be displayed. If the V-chute jam error flag has been set, the words "V-CHUTE JAM" may be displayed. In a similar manner, other errors may be indicated, based upon an error flag having been set. For example, these errors would include "ONE POSITION ERROR", "TWO POSITION ERROR", "INJECTOR UP ERROR", "INJECTOR DOWN ERROR", "ONE INJECTOR ERROR", "TWO INJECT ERROR", "NO PARTS". The purpose of the display is merely to provide some visual feed back for the operator, so the present invention contemplates that other messages may be displayed.

The count event interrupt subroutine is used to monitor the lower V-chute sensor, updating the count each time a precision resistor core is detected.

The feed hold interrupt subroutine monitors the status of the feed hold switch, that activates the laser spiraller. When the feed hold valve is turned on, the red power light is turned on to indicate that the tube feeding process has stopped.

Figure 13:
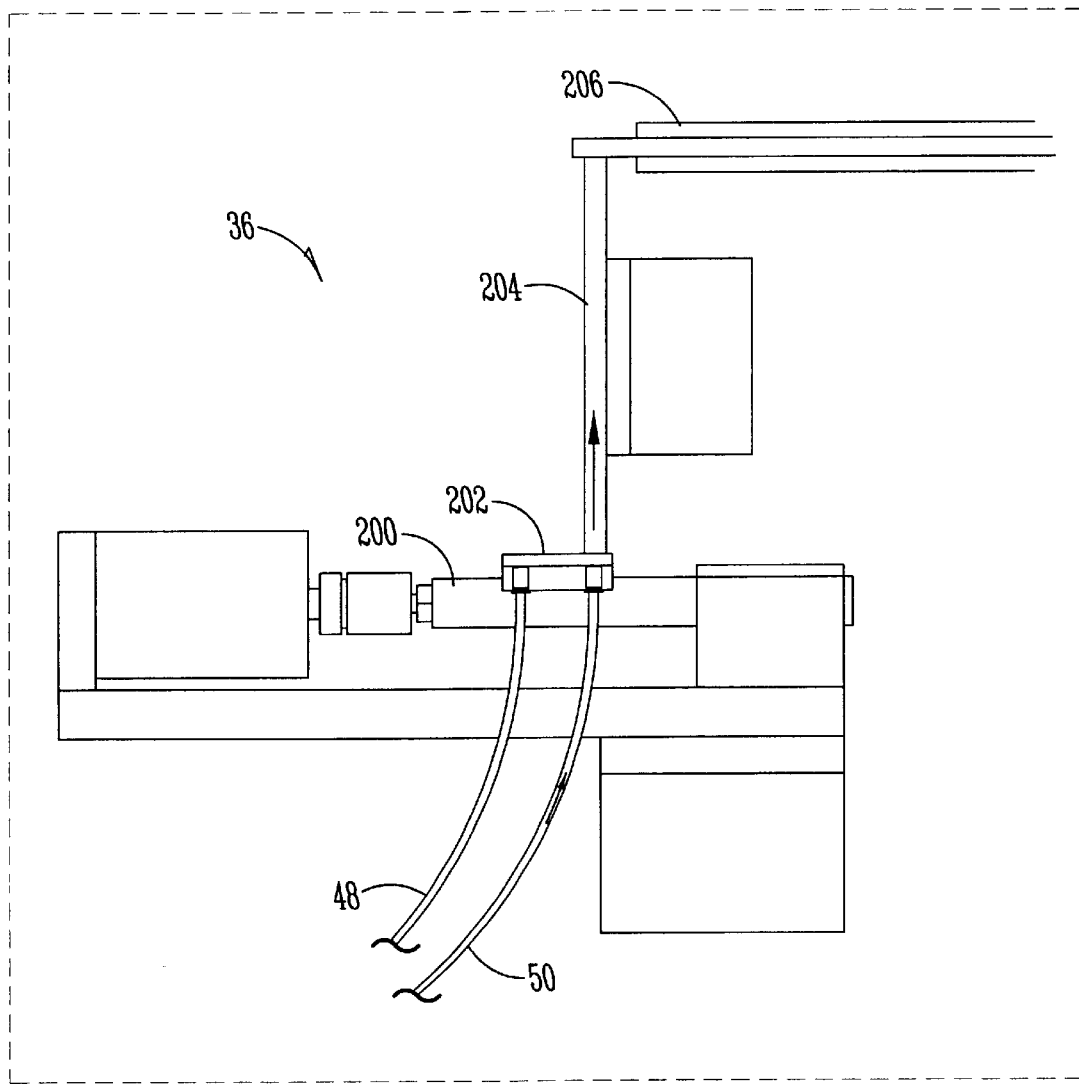
FIG. 13 is a front view of the welder unloading mechanism of the present invention.

Once a tube magazine is filled, the tube magazine may be carried or toted to the welder unloading mechanism 36 as shown in FIG. 13. The welder unloading mechanism 36 is similar to the injector mechanism 34 in that there is a tube shuttle 200 which permits multiple tube magazines to be used. The use of multiple tube magazine allows for continuous operation of the welder unloading mechanism 36. In FIG. 13, precision resistor cores from tube magazine 50 are air injected into the feed rail mechanism 202 by compressed air which is fed into the tube magazine from the opposite end. The precision resistor cores travel up through the welder resistor feeder 204 where they enter the welder index wheel 206. Thus, the precision resistor cores can then have the terminals welded onto each core.

Figure 14:
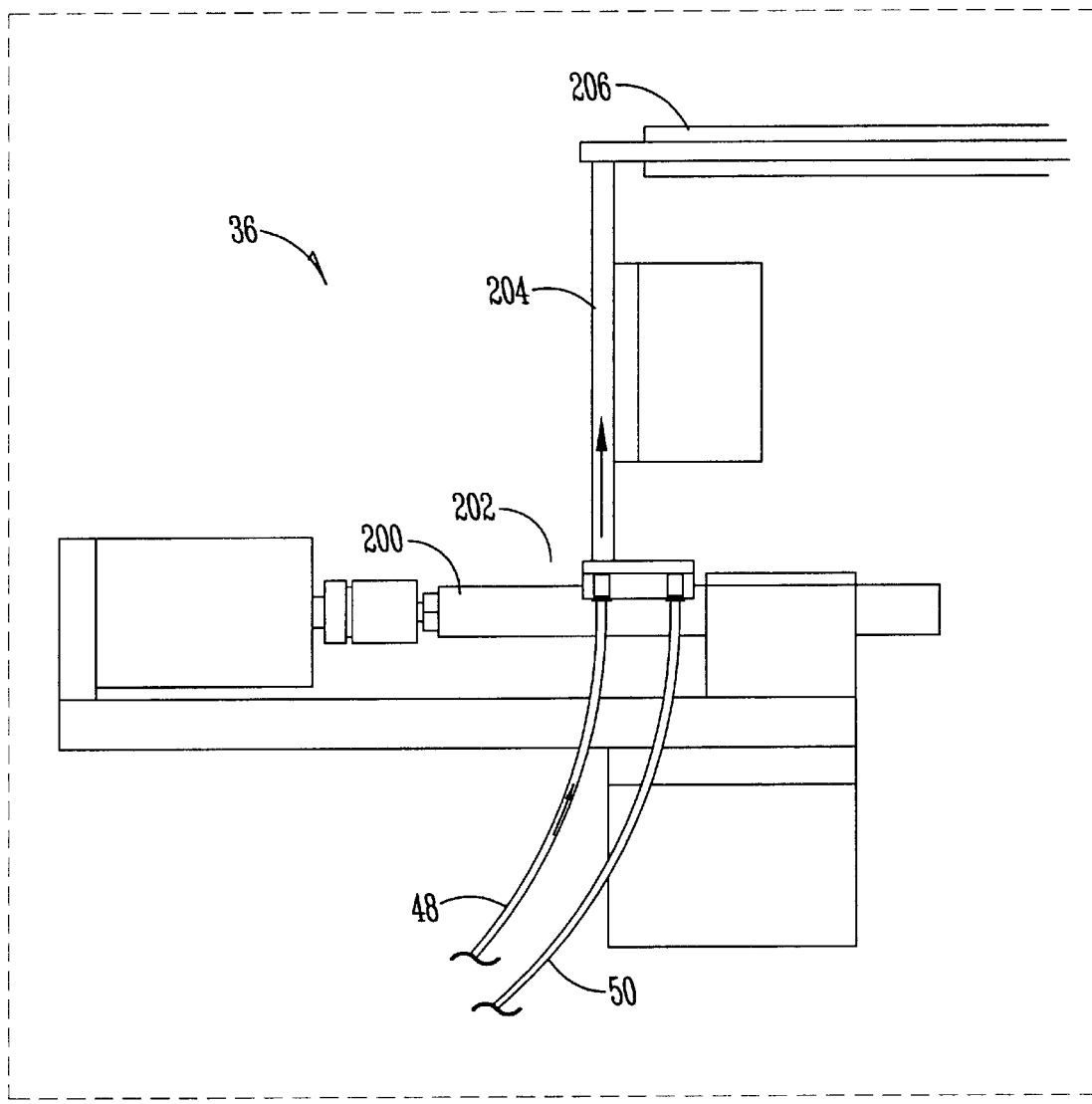
FIG. 14 is a front view of the welder unloading mechanism of the present invention with the tube magazine shuttle in a second position.

FIG. 14 shows the same welder unloading mechanism 36, except for in FIG. 13, the tube magazine shuttle 200 is positioned so that precision resistor cores are received from tube magazine 48 instead of tube magazine 50. Thus one tube magazine may be replaced while another is used.

Thus, an apparatus, system, and method for precision resistor tube feeding has been disclosed which solves problems and deficiencies in the art. It will be readily apparent to those skilled in the art that the present invention contemplates variations in the number of sensors, the selection of sensors, and the placement of sensors, variations in the method of electronic control, variations in the user interface, variations in the number of tube magazines, and variations in the type of tubing and type of tube. These variations and modifications are within the spirit and scope of the invention now claimed.

What is claimed is:

1. A method of storing and transporting resistor cores, the method comprising:
   air injecting the resistor cores from a machine at a first location into a length of tubing, said tubing comprising symmetrical end fittings; and
   disconnecting the length of tubing from the machine and transporting said tubing to a second machine at a second location.

2. The method of claim 1 further comprising transporting the length of tubing.

3. The method of claim 1 wherein in the air injecting step, the resistor cores are received from a laser spiraller.

4. The method of claim 1 further comprising:
   air injecting the resistor cores from the length of tubing into a terminal welder.

5. A method of manufacturing resistors comprising:
   connecting a first machine to a length of tubing, said tubing comprising symmetrical end fittings;
   air injecting resistor cores into the length of tubing from the first machine;
   disconnecting the length of tubing from the first machine;
   connecting the length of tubing to a second machine; and
   air injecting the resistor cores from the length of tubing into the second machine.

6. The method of claim 5 wherein the first machine is a laser spiraller.

7. The method of claim 5 wherein the second machine is a terminal welder.

8. The method of claim 5 wherein the second machine is a capper.

9. A method of manufacturing precision resistor core comprising:
   receiving precision resistor cores from a laser spiraller;
   counting the received precision resistor cores;
   air injecting the precision resistor cores into a length of tubing;
   transporting the length of tubing;
   air injecting the resistor cores from the tubing into a welder.

* * * * *